June 11, 1963 K. SCHMIDT 3,093,579
SEPARATION OF SOLID SUBSTANCES FROM LIQUIDS
Filed Jan. 17, 1961
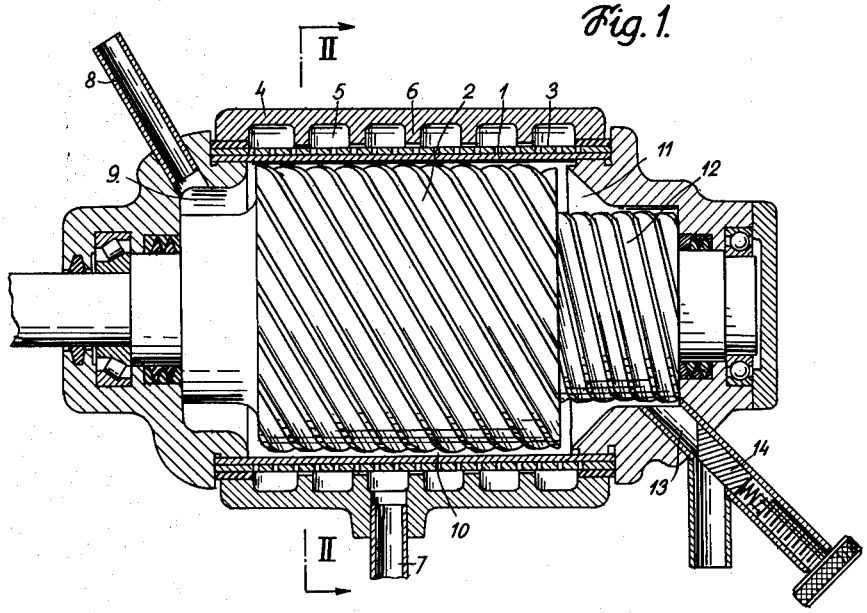
Fig. 1.
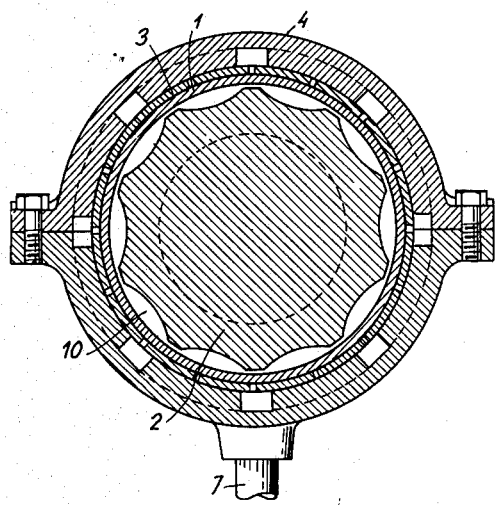
Fig. 2.
INVENTOR.
Karol Schmidt
BY

United States Patent Office

3,093,579
Patented June 11, 1963

3,093,579
SEPARATION OF SOLID SUBSTANCES FROM LIQUIDS
Karol Schmidt, Bratislava, Czechoslovakia, assignor to Vyzkumny ustav energeticky, Prague, Czechoslovakia, a corporation of Czechoslovakia
Filed Jan. 17, 1961, Ser. No. 83,255
3 Claims. (Cl. 210—117)

Many ways and devices for the separation of solid substances from liquids are known, among which still prevail filter-presses requiring manual operation. Presently continuously working filters equipped with a mechanical device removing the accumulated solid substances, are primarily vacuum filters. The disadvantages of these filters are not only their high investment costs, but also their uneconomical operation. Such vacuum filters are often difficult to operate and they show permanent losses especially when volatile dissolvents are used. Another disadvantage of the vacuum filters is that these filters work with a difference of pressure of merely one atmosphere or even less, this being in many cases insufficient.

Filtration apparatuses, where the separation of solid substances and their removal is effected by a worm, are quite little developed and their use has been limited to laboratory work. Worm-filters have found no application in industrial practice since the use of a one-way worm prevents the construction of larger units by a simple linear enlargement of dimensions. The main difficulty was the disproportion between the volume of the mixture brought into the apparatus and the filtration surface, and the rapid decrease of the output of the filter as soon as the dimensions of this filter were enlarged.

The present invention successfully solves the long existing problem of continuous separation on large scale of solid matters from liquids. The invention eliminates not only the obstacles which have prevented a larger use of equipments operating on the principle of the worm-filters, but it also brings considerable advantages when compared with the vacuum-filters and it excludes the loss of dissolvents, since the filtration process is effected under pressure and in a completely encased space.

The said and other objects of the invention will be more fully understood from the following specification when read with the accompanying drawing in which one embodiment of the new filtration apparatus is shown in FIG. 1 in a longitudinal section and in FIG. 2 in a cross section. Within a suitable cylindrically shaped filtering material 1 enclosing a filter chamber is rotatably placed a grooved cylinder 2 practically filling said chamber. The filtering material 1 is secured against pressure by a perforated cylindrical jacket 3. All the said parts are enclosed in a pressure-resistant casing 4, the interior of which is provided with ribs or lugs 6, which distance the jacket 3 from the wall of the casing 4 leaving draining channels 5 through which the filtered liquid flows to the lower part of the casing 4 to be discharged through the outlet 7. The mixture to be filtered enters under pressure 0.1 to 10 atmos. through the inlet 8 into the filter chamber more particularly into its ante-chamber 9 from which it is distributed into a plurality of parallel helicoidal grooves 10 arranged on the periphery of the cylinder 2. Said parallel helicoidal grooves 10 are of identical depth, width and length and they run closely adjacent to each other though separated by their marginal edges which reach as closely as possible to the surrounding cylindrical filter 1 and prevent a communication between the individual grooves. The rotary movement of the cylinder 2 forces the treated mixture forward and against and through the filter 1. As the mixture moves forward it becomes more and more concentrated in the grooves 10, and finally enters the collection chamber 11. Within this collection chamber 11 rotates an auxiliary worm 12 which is integral with the cylinder 2 and which presses the material with the discharge opening 13 controlled by a check valve 14.

This device is characterized by substantial advantages in comparison with worm-filters where the mixture moved in a single spiral flow limited by the shaft of the worm and the filtration wall, the disadvantage of which was the disproportion between the quantity of the liquid and the filtration surface. This disadvantage is eliminated by this invention, since the filtered mixture advances through the operation space in a number of flows, separated from each other by grooves, the form and length of which enables the best filtration effect. The solid matters contained in the liquid are simultaneously and continuously removed from the filtration surface, which maintains its constant permeability for a practically unlimited time.

The filtering material may be cotton, wool, metal or plastics. The jacket 3 may be made of metal or of plastic material. The grooved cylinder 2 may also be of metal or suitable plastic material.

The large number of the shallow helicoidal grooves ensure the rapid separation of solid matters from the liquids. The mixture concentrated to the maximum degree is immediately removed from the filter. The separated liquid is perfectly free of solid matter.

The device according to the invention succeeds in attaining a perfect harmony between the quantity of the mixture passing through and the filtering surface. Consequently, the device is suitable for the treatment of mixtures of various character and concentration. The character of the mixture is given by the liquid viscosity changing with the temperature, by the concentration of solid matters and by their permeability. All these factors including the applied pressure are of fundamental importance for the choice of the size of the device and of the suitable form, number and length of the grooves. For this purpose it is advisable to get practical experience first with a simple experimental apparatus constructed on the principle of the invention. On the basis of such apparatus a filtration unit of the necessary output can be developed, since the increase of capacity depends directly on the enlargement of the filtration surface. Such filtration units require only small investment costs, no operation and only small maintenance costs. They work economically and can be completely mechanized.

What I claim is:

1. A continuous rotary filtering device comprising in combination a relatively large diameter cylinder of filtering material defining a cylindrical filtering chamber; a casing surrounding said filtering material cylinder and defining therewith a drainage space; a liquid discharge outlet communicating with said drainage space; an inlet at one end of said chamber for ingress, under pressure, of material to be filtered; a concentrate discharge outlet at the opposite end of said chamber; a cylindrical body disposed concentrically of said filtering chamber and mounted therein for rotational movement at a speed excluding centrifugal action upon the material passing through the filtering chamber; the diameter of said body approaching the internal diameter of said filtering material cylinder to an extent such as to provide substantially only running clearance between said body and said filtering material cylinder; and a plurality of axially juxtaposed but closely adjoining parallel, helical flutes extending on the cylindrical surface of said body through the axial extent thereof, said flutes having a substantially equal and constant depth not exceeding one twentieth part of the diameter of said body and a substantially equal and constant width not exceeding one tenth part of said diameter, whereby material entering said inlet under pressure is moved by said flutes during rotation of said body in a plurality of separated narrow and shallow helical flows to said concentrate discharge outlet and is compressed between the surface of said flutes and the inner surface of said filtering material cylinder to force therethrough liquid from the material into said annular drainage space.

2. A continuous rotary filtering device comprising in combination a relatively large diameter cylinder of filtering material defining a cylindrical filtering chamber; a casing surrounding said filtering material cylinder and defining therewith a drainage space; a liquid discharge outlet communicating with said drainage space; an inlet at one end of said chamber for ingress, under pressure, of material to be filtered; a concentrate discharge outlet at the opposite end of said chamber; a cylindrical body disposed concentrically of said filtering chamber and mounted therein for rotational movement at a speed excluding centrifugal action upon the material passing through the filtering chamber; the diameter of said body approaching the internal diameter of said filtering material cylinder to an extent such as to provide substantially only running clearance between said body and said filtering material cylinder; and a plurality of axially juxtaposed but closely adjoining parallel, helical flutes extending on the cylindrical surface of said body through the axial extent thereof, said flutes having a substantially equal and constant depth not exceeding about one twentieth part of the diameter of said body and a substantially equal and constant width not exceeding about one tenth part of said diameter, whereby material entering said inlet under pressure is moved by said flutes during rotation of said body in a plurality of separated narrow and shallow helical flows to said concentrate discharge outlet and is compressed between the surface of said flutes and the inner surface of said filtering material cylinder to force therethrough liquid from the material into said annular drainage space; means forming a relatively smaller diameter substantially cylindrical collecting chamber extending coaxially from the discharge end of said filtering chamber; said cylindrical body having a smaller diameter cylindrical extension disposed in said collecting diameter chamber and formed with a plurality of axially juxtaposed, parallel and relatively shallow helical grooves on its cylindrical surface and each extending through the axial extent thereof; said concentrate discharge outlet communicating with the axially outer end of said collecting cylindrical chamber.

3. A continuous rotary filtering device as claimed in claim 2 including a spring biased pressure release valve disposed in said concentrate discharge outlet.

References Cited in the file of this patent

UNITED STATES PATENTS

| | | |
|---|---|---|
| 726,664 | Filson | Apr. 28, 1903 |
| 1,691,867 | Burns | Nov. 13, 1928 |
| 1,845,893 | Sommermeyer | Feb. 16, 1932 |
| 1,917,827 | Cloos | July 11, 1933 |
| 2,419,545 | Gray et al. | Apr. 29, 1947 |
| 2,761,799 | Schroeder | Sept. 4, 1956 |

FOREIGN PATENTS

| | | |
|---|---|---|
| 499 | Great Britain | Dec. 12, 1889 |
| 13,512 | Great Britain | June 6, 1911 |
| 643,617 | Germany | Apr. 13, 1937 |
| 546,527 | Italy | July 25, 1956 |
| 837,780 | Great Britain | June 15, 1960 |